US006934821B2

(12) United States Patent
Kubooka et al.

(10) Patent No.: US 6,934,821 B2
(45) Date of Patent: Aug. 23, 2005

(54) MEMORY MANAGEMENT APPARATUS, MEMORY MANAGEMENT METHOD, MEMORY MANAGEMENT PROGRAM AND COMPUTER READABLE STORAGE MEDIUM THEREIN

(75) Inventors: Yuko Kubooka, Hiroshima-ken (JP); Shigenori Doi, Hiroshima-ken (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 278 days.

(21) Appl. No.: 10/012,041

(22) Filed: Dec. 11, 2001

(65) Prior Publication Data

US 2002/0095556 A1 Jul. 18, 2002

(30) Foreign Application Priority Data

Dec. 11, 2000 (JP) ........................................ 2000-375632

(51) Int. Cl.⁷ ............................................... G06F 12/00
(52) U.S. Cl. ........................ 711/159; 711/154; 711/170; 711/171; 711/172; 711/1; 711/6; 718/1; 718/100; 718/105; 719/331; 719/332
(58) Field of Search ................................ 711/159, 160, 711/154, 170–172, 1, 6, 203; 719/331–332; 718/1, 100, 105; 707/103 R, 206; 709/217

(56) References Cited

U.S. PATENT DOCUMENTS

| | | | |
|---|---|---|---|
| 5,212,778 A | | 5/1993 | Dally et al. |
| 5,843,105 A | * | 12/1998 | Mathis et al. ............... 606/166 |
| 5,873,105 A | | 2/1999 | Tremblay et al. |
| 5,978,894 A | * | 11/1999 | Sukegawa et al. .......... 711/203 |
| 6,026,474 A | | 2/2000 | Carter et al. |
| 6,209,003 B1 | * | 3/2001 | Mattis et al. ............... 707/206 |
| 6,366,921 B1 | * | 4/2002 | Hansen et al. .......... 707/103 R |
| 6,430,607 B1 | * | 8/2002 | Kavner ....................... 709/217 |
| 6,567,906 B2 | * | 5/2003 | Laczko et al. .............. 711/203 |
| 6,629,113 B1 | * | 9/2003 | Lawrence ................... 707/206 |
| 6,738,977 B1 | * | 5/2004 | Berry et al. ................ 719/332 |
| 6,817,011 B1 | * | 11/2004 | Reynolds ................... 717/130 |
| 6,862,674 B2 | * | 3/2005 | Dice et al. .................. 711/170 |
| 6,865,657 B1 | * | 3/2005 | Traversat et al. ........... 711/170 |
| 2002/0108025 A1 | * | 8/2002 | Shaylor ...................... 711/203 |

FOREIGN PATENT DOCUMENTS

JP  2000-132208  5/2000

OTHER PUBLICATIONS

Stefanovic et al. at Department of Computer Science in University of New Maxico, Albuquerque, NM 87131, "older-first garbage collection in practice: evaluation in a Java Virtual Machine", Jun. 2002.*

(Continued)

*Primary Examiner*—Matthew D. Anderson
*Assistant Examiner*—Zhuo H. Li
(74) *Attorney, Agent, or Firm*—McDermott Will & Emery LLP

(57) ABSTRACT

A memory management method in which the memory area can be used efficiently, avoiding the overhead caused by copying to generate Java object.

In a memory having a variable address memory area where a Java object to be executed by Java application is stored and relocated by Java virtual machine and a fixed address memory area where data generated by another program is stored, data generated by another program in the fixed address memory area is read out as Java object according to management information for Java application to read the data.

8 Claims, 11 Drawing Sheets

OTHER PUBLICATIONS

Agesen et al. at sun Microsystem Laboratories, Garbage collection and local variable type–precision and livensess in Java virtual machine, May 1998.*

Jacque Cohen, Department of physices, Brandeis University, Waltham, Massachusetts 02254, "Garbage collection of linked data structure", Sep. 1981.*

Kenneth B Russell: "Re: Inter process communication" Online! Nov. 6, 1998 XP002192816 info–performer@sgi.com Retrieved from the Internet: <URL:ttp://oss.sgi.com/projects/performer/mail/info–performer/perf–98–11/0042.html> retrieved on Mar. 12, 2002! *the whole document *.

"SAS/C Software, Changes and Enhancements" Online! Mar. 1998, SAS Institute Inc., Cary, NC XP00219817 ISBN: 1–58025–135–8 Retrieved from the Internet: <URL:http://www.sas.com/service/library/onlined oc/sasc/doc650/changes.pdf> retrieved on Mar. 12, 2003! * p. 44–50 *.

Kordale R et al: "Distributed/concurrent garbage collection in distributed shared memory systems" Object Orientation in Operating Systems, 1993., Proceedings of the Third International Workshop on Asheville, NC, USA Dec. 9–10, 1993, Los Alamitos, CA, USA, IEEE Comput. SOS, Dec. 9, 1993, pp. 51–60, XP010097269 ISBN: 0–8186–5270–5 *p. 51, left–hand column *.

Weimin Yu et al: "Conservative garbage collection on distributed shared memory systems", Distributed Computing Systems, 1996., Proceedings of the 16th International Conference on Hong Kong May 27–30, 1996, Los Alamitos, CA, USA, IEEE Comput. Soc, US, pp. 402–410 XP010167573 ISBN: 0–8186–7399–0 *p. 402, left–hand column—p. 403, left–hand column*.

* cited by examiner

MEMORY MANAGEMENT APPARATUS, MEMORY MANAGEMENT METHOD, MEMORY MANAGEMENT PROGRAM AND COMPUTER READABLE STORAGE MEDIUM THEREIN

BACKGROUND OF THE INVENTION

1. Field of the Invention

The present invention relates to digital computer software. More specifically, the present invention concerns a memory management apparatus to manage memory in which an execution object to be executed on an object oriented program is stored, memory management method, memory management program and computer readable recording medium in which the program is recorded.

2. Description of the Related Art

With progress in computer technology, communication and broadcasting technology in recent years, multimedia systems to offer various information media such as image, sound and motion picture are spreading. Among such multimedia systems put on the market are interactive digital television, movable terminal, game machine or the like.

In the multimedia systems, large volume data, for example, image, sound and motion image data, transmitted via the communication link like the Internet, is combined with an application within the multimedia systems and is offered to users as image and sound from the screen, speaker etc. Therefore, there is needed in the multimedia systems technology for efficiently processing a large volume of data that is to be downloaded.

In recent years, Sun Microsystems' object oriented language "Java" (registered trademark) environment is spreading as a technique for materializing efficient stream processing of a large volume data such as image, sound and motion picture data from communication media.

As one example of the conventional, related art technique for an application program described in Java (hereinafter "Java application"), there will be explained a flow processing in which image data are downloaded, via communication media such as the Internet, in accordance with a request from the Java application and then used in that Java application.

FIG. 10 is a functional block diagram of a general memory management apparatus, in a multimedia environment, for downloading image data in accordance with a request executed from the Java application.

The memory management apparatus shown in FIG. 10 is formed of Java application 11 or a program formed of the Java language, Java virtual machine program (hereinafter Java VM) 12, native program 13, operating system (OS) 14 and object memory section 15.

Java application 11 has a source code described in Java, and is compiled and converted into a low pseudo code, that is, an intermediate code (hereinafter byte code). The byte code is converted into a machine language, which can be interpreted and executed by a computer (hereinafter "native code"), and is then executed by the computer.

Java VM 12 is formed of interpreter section 12a, object management section 12b, and Java Native Interface (JNI) section 12c. From Java application 11, interpreter section 12a reads out a byte code to represent an instruction, converts the instruction into a native code and execute the instruction. Object management section 12b generates data or source code (hereinafter "Java object") to be used for execution of Java application 11, or refers to generated Java objects.

Here, the Java object is a byte code defined by Java class, and is generated or instanced in object memory section 15 by object management section 12b in accordance with a request of Java application 11. The instanced Java object alone is used in execution by Java application 11 as execution object.

JNI section 12c materializes an application program interface (API) made up of a set of instructions and functions to execute native program 13 described in C language etc. in accordance with a request of Java application 11. Furthermore, JNI section 12c can have Java VM execute Java application 11 in accordance with a request from native program 13.

Object memory section 15 is formed of RAM etc. and has variable address memory area 15a to be a work area for storing or generating Java objects and fixed address memory area 15b to be a work area for native program 13 or OS 14.

Variable address memory area 15a is used as function to collect Java object unneeded by Java VM 12 (hereinafter "GC function" (garbage collection function)) and the addresses of stored data are variable and controllable. The memory areas that are unused any more are collected by the GC function to offer a continuous usable memory area, whereby the memory can be used efficiently. On the other hand, fixed address memory area 15b memorizes or stores data to be used for execution of modules such as native program 13 and OS 14, and under management of OS 14, an address is allocated to each program. Data is not relocated as in variable address memory area 15a.

As set forth above, under memory management in the execution environment of Java application 11, Java objects are generally memorized or stored in variable address memory area 15a on the memory in order to utilize GC function of Java VM12. This area is distinguished from the area where data used by native program 13 and OS 14 is stored.

Native program 13 is a native code described in the C language. Native program 13 is formed of a module that makes real time processing possible to download image data in the fixed address memory area 15b via communication media such as the Internet, satellite broadcasting, cable broadcasting etc. in accordance with a request from Java application 11.

Next, there will be explained the flow of processing when downloaded image data is used for execution of Java application 11. Here, because Java application 11 can refer to only Java object memorized in variable address memory area 15a, the downloaded image data cannot be referred to directly as Java object.

In FIG. 10, Java objects OBA, OBB are memorized in variable address memory area 15a of object memory section 15. In fixed address memory area 15b, data DA downloaded by native program 13 is stored. In the example shown in FIG. 10, Java objects OBA, OBB only can be referred to by Java application 11, and downloaded data DA cannot be referred to.

FIG. 11 is a diagram showing the state of object memory section 15 when download data DA can be referred to as Java object. First, in accordance with a request from Java application 11, object management section 12b secures a memory area in a vacant area according to download data DA.

Next, native program 13 copies download data DA in fixed address memory area 15b via JNI section 12c on variable address memory area 15a as download data DB. Download data DB copied in variable address memory area 15a will be eventually used in execution of Java application 11 as Java object.

When data in fixed address memory area 15b managed by native program 13 as mentioned above is used in execution of Java application 11, it is necessary to copy download data DA from fixed address memory area 15b to variable address memory area 15a. Because of copying, therefore, overhead occurs and could delay execution. In addition, during copying, it is necessary to secure a memory area of download data DA for the copying destination or variable address memory area 15a and the copying source or fixed address memory area 15b respectively, and it happens that the memory area is not used efficiently.

SUMMARY OF THE INVENTION

Accordingly, it is an object of the present invention to perform memory management so as to avoid overhead in copying and to use the memory area more efficiently.

In the present invention, memory is managed in which execution objects to be executed by a virtual machine program to execute the object oriented program formed of the object oriented language are stored.

This memory has a variable address memory area where an execution object is stored and the execution object is relocated by virtual machine program and a fixed address memory area which stores data generated by another program formed of a language other than the object oriented language.

When the present invention is carried out as memory management apparatus, the memory management apparatus is provided with generating means and reading means. In accordance with a request from an object oriented program, generating means generates management information for its object oriented program to read out data. In accordance with management information generated by generating means, reading means reads data generated in the fixed address memory area.

The memory management apparatus can also be provided with communication means to receive data in the fixed address memory area of the memory. In this case, data generated by another program is data received by using communication means. Generating means generates management information for the object oriented program to read data received by using communication means.

Furthermore, the memory management apparatus may be provided with detection means, kind judgement means, erasure request storage means, erasure judgement means and erasing means. Detection means detects data of which erasure is requested in accordance with a request for erasure from the object oriented program after execution of the object oriented program. Kind judging means judges whether data detected by detection means is stored either in the variable address memory area or in the fixed address memory area. If it is judged by kind judging means that data detected by detection means is stored in the fixed address memory area, erasure request storage means memorizes a request from the object oriented program for erasure of data detected by detection means. Erasure judgement means judges whether there is a request from another program for erasure of data for which the erasure request is stored in erasure request storage means. And if it is judged by erasure judgement means that there is a request from another program for erasure of data for which the erasure request is stored in erasure request storage means, erasure means erases the detected data and the management information.

Furthermore, the memory management apparatus may be provided with data judgement means to judge whether the execution object of the data is stored in the variable address memory area in accordance with data stored in the fixed address memory area. If it is judged that the execution object of data stored in the fixed address memory area is not stored in the variable address memory area, generating means generates management information on the data.

The present invention may be carried out as memory management method, too. In this memory management method, a generating step and a reading step are performed. In the generating step, management information for the object oriented program to read data is generated in accordance with a request from the object oriented program. In the reading step, data generated in the fixed address memory area is read according to management information generated in the generating step.

Furthermore, the memory management method can include a communication step to receive data in the fixed address memory area of memory. In this case, data generated by another program is data received in the communication step. In the generating step, in addition, management information is generated for the object oriented program to read data received in the communication step.

Also, the memory management method may include a detection step, kind judgement step, erasure request storage step, erasure judgement step and erasure step. First, in the detection step, data of which erasure is requested in accordance with a request for erasure from the object oriented program is detected after execution of the object oriented program. Then, in the class judgement step, it is judged whether the data detected in the detection step is stored either in the variable address memory area or in the fixed address memory area. In the erasure request storage step, if it is judged in the kind judgement step that the data detected in the detection step is stored in the fixed address memory area, a request from the object oriented program for erasure of the data detected in the detection step is stored. In the erasure request step, furthermore, it is judged whether there is a request from another program for erasure of data for which the erasure request is stored in the erasure request storage step. And in the erasure step, if it is judged that there is a request from another program for erasure of data for which the erasure request is stored in the erasure request step, the detected data and the management information are erased.

Furthermore, the memory management method may include a data judgement step judging whether the execution object of data is stored in the variable address memory area in accordance with data stored in the fixed address memory area. In the generating step, if it is judged by data judgement means that the execution object of data stored in the fixed address memory area is not stored in the variable address memory area, management information on the data will be generated.

Also, the present invention may be carried out as memory management program or as computer-readable storage medium storing the memory management program.

This memory management program is a program to have the computer execute the above-mentioned memory management method. With the memory management program read by computer, software and hardware resource cooperate to materialize generating of management information on the data stored in the fixed address memory area and reading of data on the basis of the management information. As a result, a memory management apparatus, for example, is built by utilizing a computer. Also, if a computer in which a memory management program is read works, a memory management method is built.

Memory management programs are distributed or sold by communication via communication media such as, for example, the Internet, and also are distributed or sold in the form stored in a storage medium.

DESCRIPTION OF THE PREFERRED EMBODIMENTS

Now, the embodiments of the present invention will be described with reference to the drawings.
Embodiment 1

Figure 1:
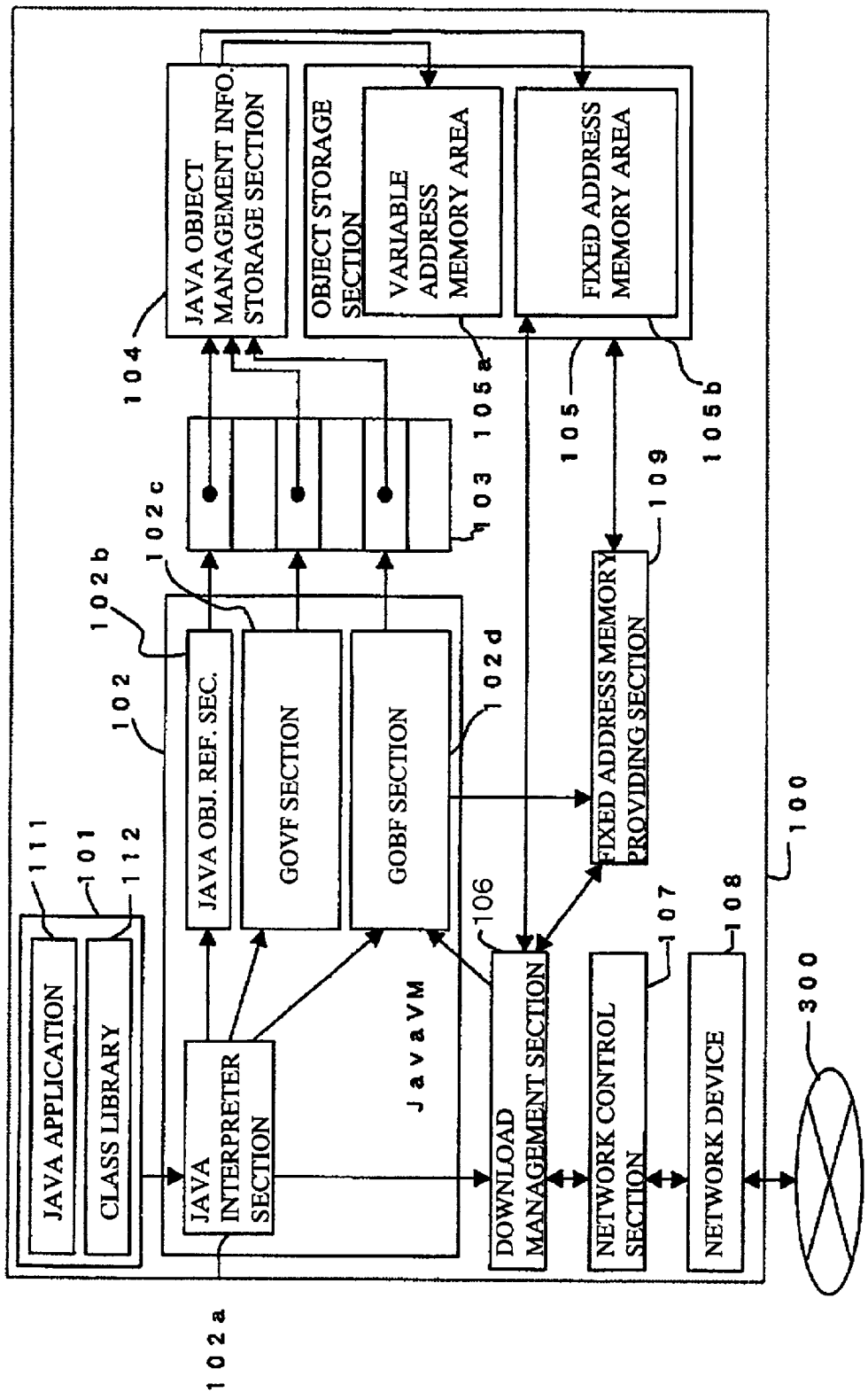
FIG. 1 is a functional block diagram showing an outline configuration of a memory management apparatus according to Embodiment 1 of the present invention.

FIG. 1 is a functional block diagram showing a rough configuration of memory management apparatus 100 according to Embodiment 1 of the present invention. In FIG. 1, memory management apparatus 100 is provided with Java application storage section 101, Java VM 102, Java object table 103, Java object management information storage section 104, object storage section 105, download management section 106, network control section 107, network device 108 and fixed address memory providing section 109, for example.

Java application storage section 101 stores Java application 111 and class library 112. Java application 111 is formed of a program described in object oriented language Java. The source code of Java application 111 is compiled and converted into a byte code. To Java VM 102, this byte code is sent. Class library 112 is a library where classes are collected in which the data structure inside Java object is defined by the lump. Java application storage section 101 according to the present embodiment that is formed of random access memory (RAM) may be materialized with read only memory (ROM), hard disk etc.

Java VM 102 is provided with Java interpreter section 102a, Java object reference section 102b, Java object generating section for variable address memory area (hereinafter "GOBV section") 102c and Java object generating section for fixed address memory area ("GOBF section") 102d, for example.

Java interpreter section 102a reads out instructions from Java application 111 one by one, interprets and executes each instruction. This memory management apparatus 100 adopts execution mechanism of the interpreter but can be properly switched to such execution mechanism such as compiler. Java object reference section 102b materializes reading out an already generated Java object in accordance with a request from Java application 111. GOBV section 102c and GOBF section 102d generate Java objects in object storage section 105 in accordance with a request from Java application 111.

Java object table 103 stores pointers pointing to addresses of Java object management information. Java object management information storage section 104 stores Java object management information. Java object management information is information to manage the Java object in object storage section 105 and data concerning the class of its Java object. Information concerning the Java object includes data size, pointer pointing to the addresses of Java objects in object storage section 105, for example. Information concerning the class is information necessary for execution or reference by Java application 111 such as a class name indicting the type of Java object, execution code etc.

Object storage section 105 is formed of RAM etc. Object storage section 105 is provided with variable address memory area 105a to be a work area for generating a Java object and fixed address memory area 105b where data managed by OS or other applications (not shown) are stored.

In variable address memory area 105a, a Java object is generated by GOBV section 102c of Java VM 102. The address of the stored Java object, which is used in the GC function of Java VM 102, is variable and controllable.

Meanwhile, fixed address memory area 105b stores data generated by each program under management of OS (not shown). And no relocation of data is executed by GC function of Java VM 102 as in variable address memory area 105a.

Download management section 106 is materialized by a program described both in native language like C language that generates native code depending on the platform and Java language, and executes memory management in fixed address memory area 105b of data received via the Internet 300.

Network control section 107 controls network device 108 formed of a modem, terminal adapter (TA) etc. and receives data from Internet 300. Network control section 107 requires real time processing and is materialized by a program formed of a native language such as C language.

When data is received in accordance with a request of Java application 111, fixed address memory providing section 109 offers to download management section 106 a memory area to store received data from a vacant area of fixed address memory area 105b.

The control section including the central processing unit (CPU) (not shown) materializes control action to be executed by memory management apparatus 100 in cooperation with the circuits other than CPU according to the program of the present invention. For the purpose of simplicity, the following description is made on the assumption that control actions involving CPU are controlled directly by programs such as Java application.

Figure 2:
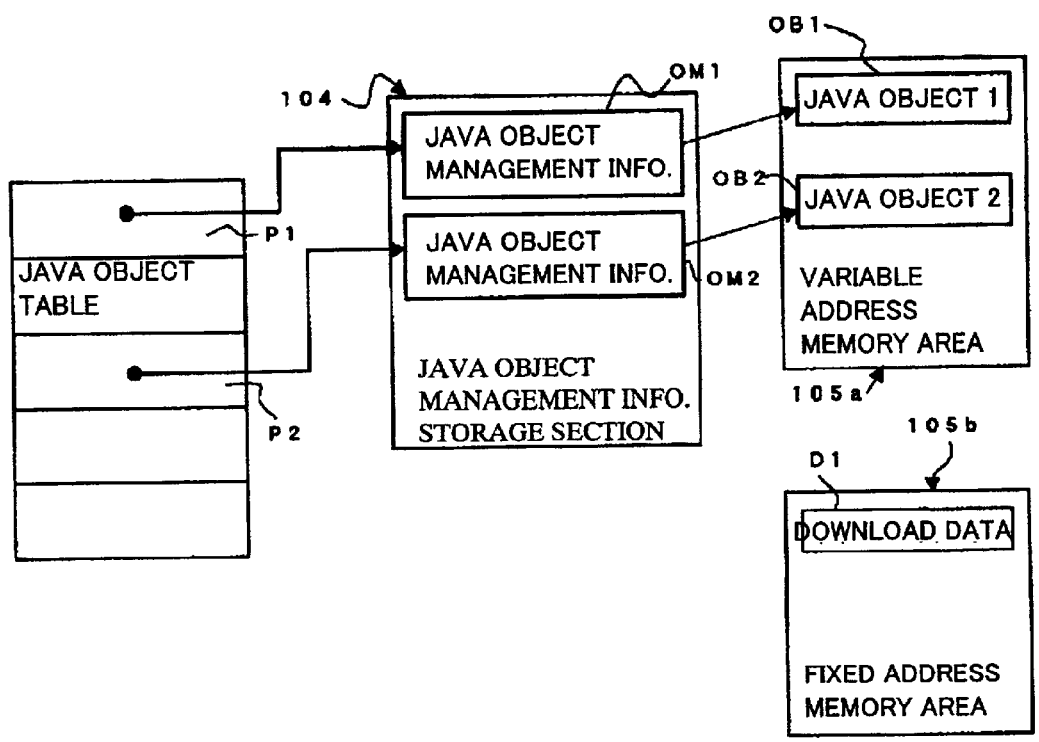
FIG. 2 is a diagram showing a configuration of data stored in an object table, object management information storage section and object storage section according to embodiment 1.

Next, the data formation of Java object control in memory management apparatus 100 will be described with reference to the drawings. FIG. 2 is a diagram showing a configuration of data stored in Java object table 103, Java object management information storage section 104 and object storage section 105.

In FIG. 2, OB1 is a Java object generated by GOBV section 102c in variable address memory area 105a. OM1 is Java object management information of Java object OB1. This Java object information includes class information and pointer pointing to the address of Java object OB1 in variable address memory area 105a. P1 is a pointer pointing to the address in Java object management information storage section 104 of Java object management information OM1. By referring to pointer P1 and Java object management information OM1, Java application 111 can read out Java object OB1 via Java object reference section 102b and use the same for execution of Java application.

Similarly, OB2 is a Java object generated by GOBV section 102c in variable address memory area 105a. OM2 is Java object management information of Java object OB2. This Java object management information includes class information and a pointer pointing to the address of Java object Java object OB2 in variable address memory area 105a. P2 is a pointer pointing to the address in Java object management information storage section 104 of Java object management information OM2. By referring to pointer P2 and Java object management information OM2, Java application 111 can read Java object OB2 via Java object reference section 102b and uses the same for execution of Java application.

D1 indicates data downloaded by download management section 106 from the Internet 300 to fixed address memory area 105b. Here in this memory management apparatus 100, data generated in fixed address memory area 105b by a native program other than Java application such as download management section 106 can be read out as Java object in accordance with a request of Java application 111. In the example shown in FIG. 2, Java object management information to read out download data D1 is generated by GOBF section 102d. Because of this, download data D1 received in fixed address memory area 105b from the Internet 300 can be read out as Java object without copying in variable address memory area 105a.

Figure 3:
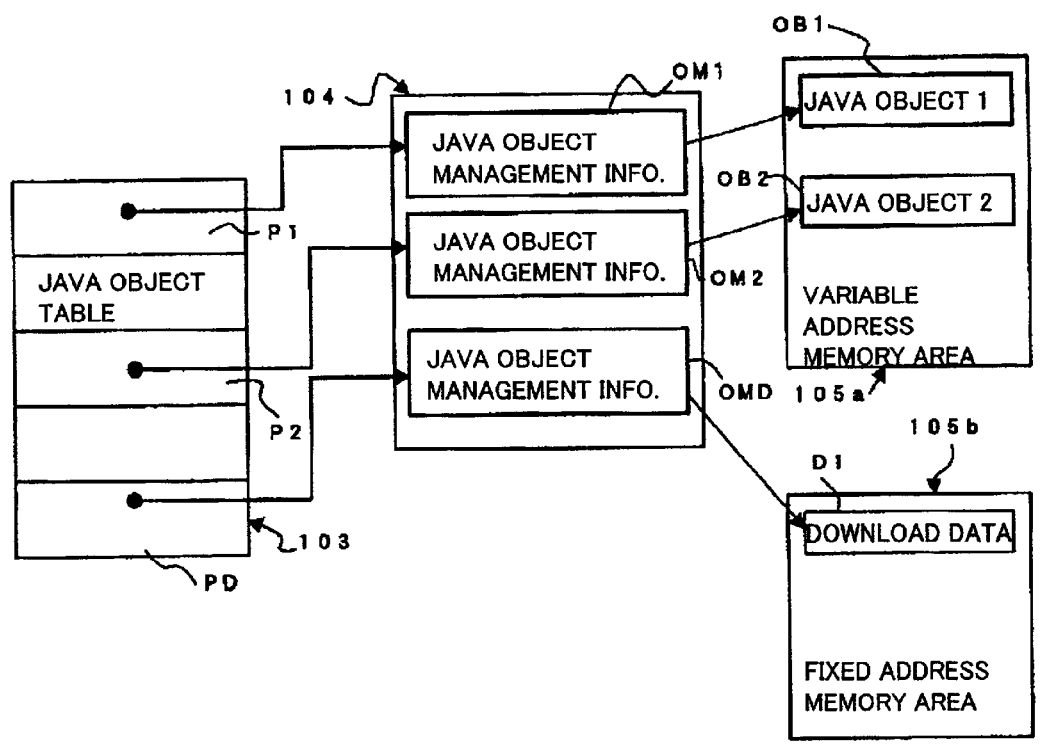
FIG. 3 is a diagram showing a state of a generated Java object management information on download data according to Embodiment 1.

FIG. 3 is a diagram showing the state of a generated Java object management information of download data D1 shown in FIG. 2. OMD is Java object management information including class information and a pointer pointing to the address of download data D1 in the fixed address memory area. PD is a pointer pointing to the address of Java object management information OMD in Java object management information storage section 104. By referring to pointer PD and Java object management information OMD, Java application 111 can read out download data D1 as Java object via Java object reference section 102b and can use the same for execution of Java application.

Figure 4:
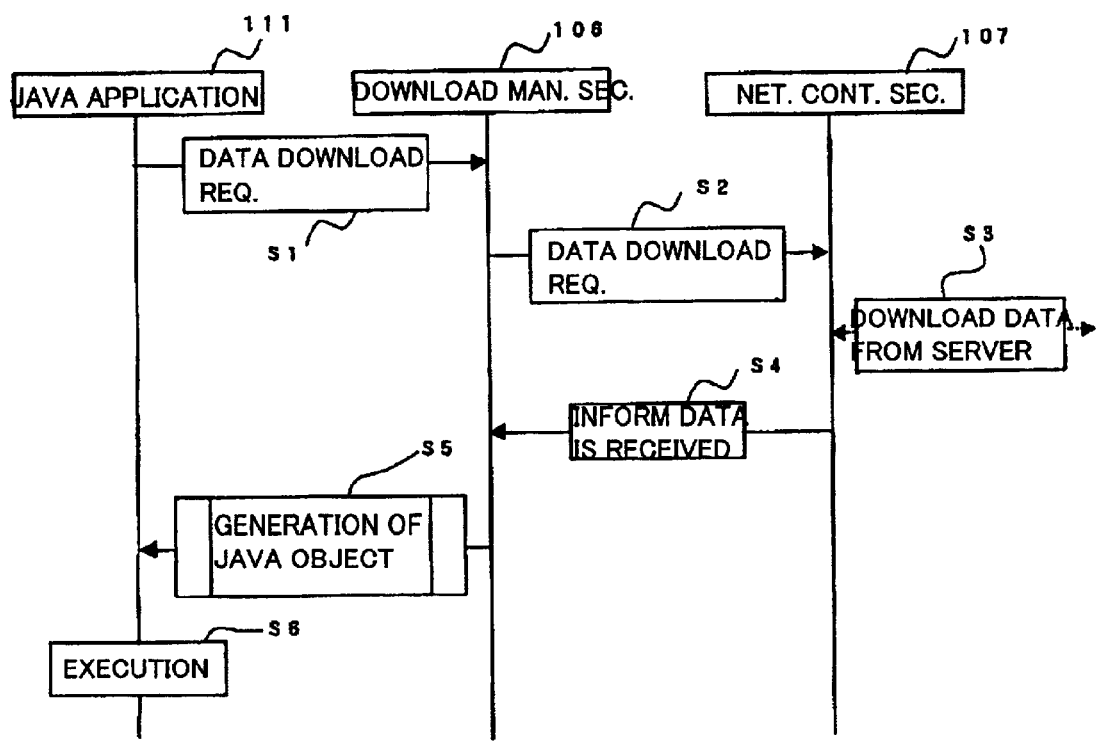
FIG. 4 is a diagram showing the flow of the process from the receiving of downloaded data to reading out of downloaded data as Java object according to Embodiment 1.

Now, there will be explained the flow of processing from the downloading of download data D1 to reading out the downloaded data as Java object in memory management apparatus 100 according to the present embodiment. FIG. 4 is a diagram showing the flow from receiving of download data D1 to reading out the downloaded data as Java object.

Java application 111 issues a receiving request to download management section 106 through Java VM 102 by specifying identification information on data to be downloaded (Step S 1). To be specified as identification information on data to be downloaded are identification number of data and its storage place, Uniform Resource Locator (URL).

Then, download management section 106 issues a download request to network control section 107 by specifying the identification number of data to be downloaded and the address where the data is stored in fixed address memory area 105b (Step S 2). Network control section 107 makes a connection with the data storage place on the Internet 300 specified in Step S 1 via network device 108 and downloads the specified data. The downloaded data as download data D1 (see FIG. 2) is stored at the address in fixed address memory area 105b specified in Step S 2 (Step S 3).

After the downloading of download data D1 is over, network control section 107 informs download management section 106 that the downloading is completed (Step S 4). After the downloading is over, the generation of Java object, which will be described later, is executed by Java VM 102 on the basis of download data D1 (Step S 5). After Java object management information OMD is generated by Java object generation processing in Step S 5, download data D1 as Java object is read out by Java application 111 and is used for execution of Java application (Step S 6).

Figure 5:
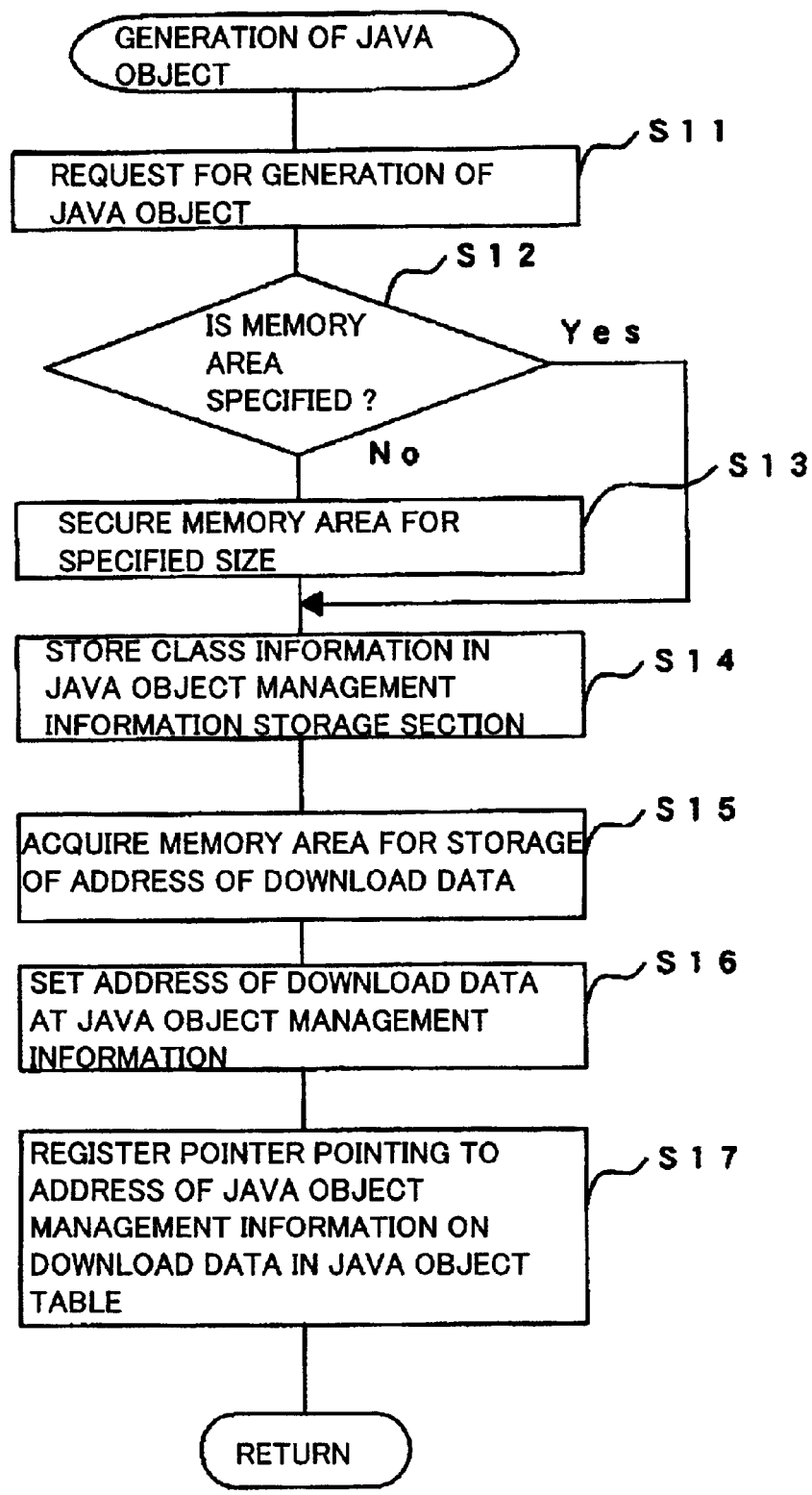
FIG. 5 is a flow chart showing the flow of Java object generation according to Embodiment 1.

Next, there will be described the processing flow of Java object generation (Step S 5). FIG. 5 is a flow chart showing the flow of Java object generation (Step S 5).

Download management section 106 requests GOBF section 102d to generate Java object on the basis of download data D1 by specifying download data D1 in fixed address memory area 105b (Step S 11). Then, it is judged whether the address at which download data D1 is stored in fixed address memory area 105b is specified (Step S 12). If the address is not specified (Step S 12; No), a memory area for a specific volume in fixed address memory area 105b is provided by fixed address memory providing section 109 (Step S 13). In the case of FIG. 2, since the address of download data D1 is already specified by download management section 106 in Step S 2, the processing in Step S 13 is not executed and the process proceeds to Step S 14.

If the address of download data D1 to be converted into Java object is specified (Step S 12; Yes), class information corresponding to Java object to be generated is read out from class library 112 via Java VM 102, and stored as Java object management information OMD of Java object management information storage section 104 (Step S 14).

A memory area where a pointer pointing to the address of download data D1 is stored as Java object management information OMD is secured in Java object management information storage section 104 (Step S 15). The pointer pointing to the address of download data D1 in fixed address memory area 105b is stored as Java object management information OMD in the secured memory area (Step S 16).

Then, pointer PD pointing to the address of Java object management information OMD is stored in Java object table 103 (Step S 17). After that, download data D1 is delivered to Java application 111 by download management section 106. Furthermore, download data D1 is read out by Java object reference section 102b in accordance with Java object management information OMD and is used in execution of Java application 111 (Step S 6 in FIG. 4).

As described, downloaded data generated in fixed address memory area 105b can be directly read out as Java object, and therefore the copying of downloaded data in variable address memory area 105a is not needed, and the processing overhead is eliminated and the processing load of the memory management apparatus is reduced.

During the copying, furthermore, there is no need to secure two memory areas in variable address memory area 105a and fixed address memory area 105b respectively in order to generate Java objects, whereby the memory area can be used efficiently. That is especially beneficial where a large volume of data such as sound and image data is downloaded and referred to in Java application 111. That is because when a large volume of data is received, there will be no need to secure a large volume memory area for both variable address memory area 105a and fixed address memory area 105b. Needless to say, the present invention can be applied when a source code is downloaded.

In FIG. 4, after the downloading is over (Step S 3), Java object management information of the downloaded data is generated (Step S 5), and the downloaded data can be referred to directly from Java application 111, but the processing procedure can be changed to further improve the efficiency of real-time processing. To be specific, even if the downloading of data is not completed, data still being downloaded can be referred to from Java application 111.

In FIG. 4, for example, after identification information of data to be downloaded is specified by Java application 111 (Step S 1), Java object management information is generated in advance by generation of Java object in step S 5. By this, data being downloaded can be read out directly as Java object. As a result, the efficiency of real-time processing can be further improved as compared with the conventional technique that undergoes copying from fixed address memory area 105b to variable address memory area 105a. In this case, in Java object generation processing in FIG. 5, the address of fixed address memory area 105b is not specified (Step S 12 in FIG. 5; No), and therefore a memory area in fixed address memory area 105b is provided by fixed address memory providing section 109 (Step S 13 in FIG. 5).

Embodiment 2

Embodiment 2 of the present invention will be explained in detail with reference to the drawings. In the memory management apparatus according to the present embodiment, data of fixed address memory area 105b is read out according to Java object management information as in memory management apparatus 100 according to Embodiment 1. Furthermore, when execution of Java application is over and data of fixed address memory area 105b is not needed any more, unneeded data is erased from the fixed address memory area. As unneeded data of fixed address memory area 105b is erased, a vacant area can be effectively secured as native program or OS work area.

Figure 6:
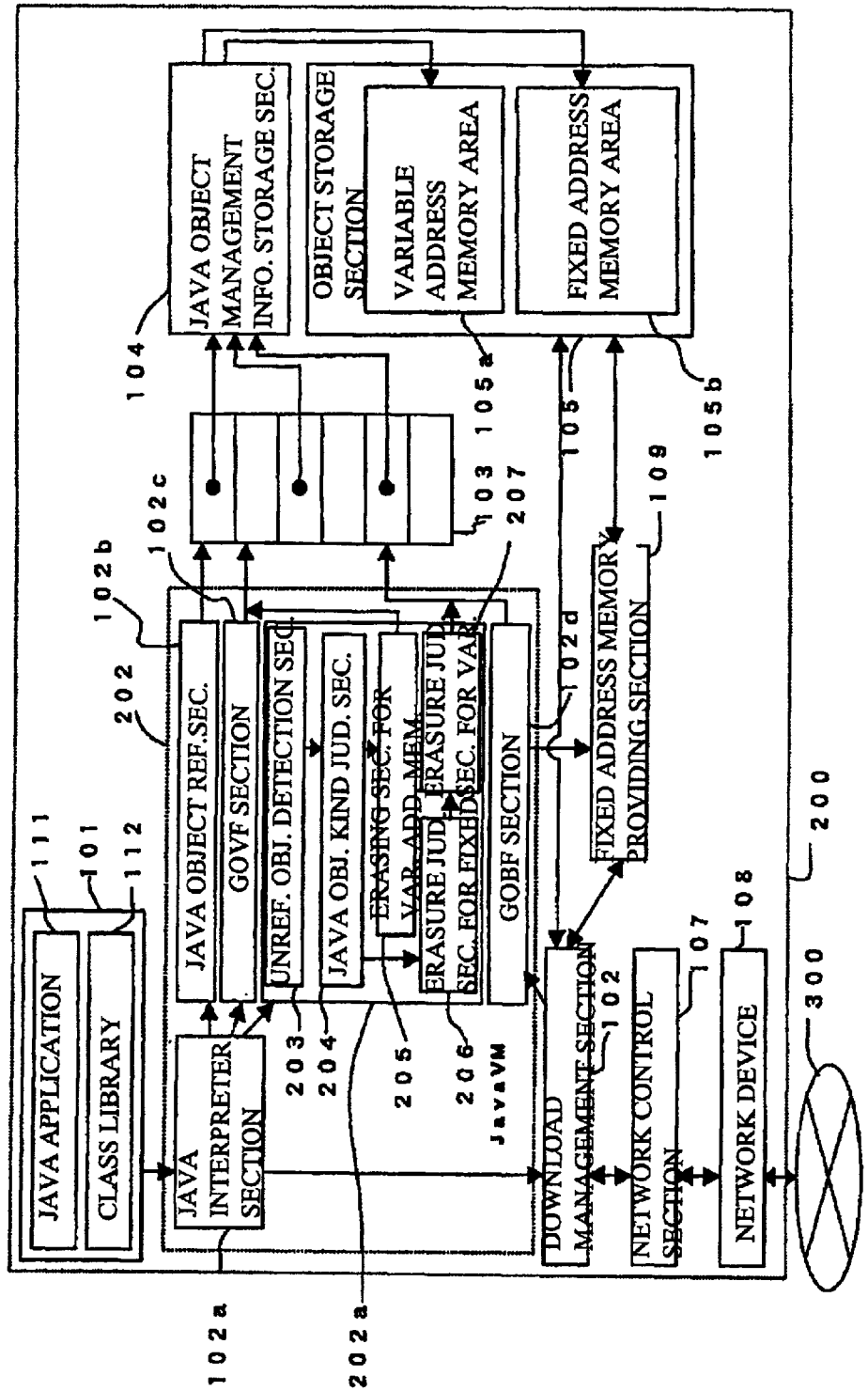
FIG. 6 is a functional block diagram showing a rough configuration of a memory management apparatus according to Embodiment 2.

FIG. 6 is a functional block diagram showing a rough configuration of memory management apparatus 200 according to Embodiment 2 of the present invention. Memory management apparatus 200 according to the present embodiment is provided with Java application storage section 101, Java VM 202, Java object table 103, Java object management information storage section 104, object storage section 105, download management section 106, network control section 107, network device 108, fixed address memory providing section 109, for example. Java application storage section 101, Java object table 103, Java object management information storage section 104, object storage section 105, download management section 106, network control section 107, network device 108 and fixed address memory providing section 109 are identical with those of Embodiment 1 in basic configuration and function, and details of the respective sections will not be explained.

Differences in configuration between memory management apparatus 200 according to the present embodiment and memory management apparatus 100 according to Embodiment 1 is that Java VM 202 further comprises garbage processing section 202a.

Garbage processing section 202a is provided with unreference object detection section 203, object kind judgement section 204, erasing section 205 for variable address memory, erasure judgement section 206 for fixed address memory and erasing section 207 for fixed address memory, for example. Garbage processing section 202a materializes a function of erasing unneeded Java object stored in variable address memory area 105a and fixed address memory area 105b in accordance with a request from Java application 111 and download management section 106.

Unreference object detection section 203 detects unneeded objects not referred to by Java application 111 from among the Java objects stored in object storage section 105.

Java object kind judgement section 204 judges in which the unneeded Java object detected by unreference object detection section 203 is stored, in variable address memory area 105a or fixed address memory area 105b.

Erasing section 205 for variable address memory erases unneeded Java objects stored in variable address memory area 105a.

Erasure judgement section 206 for fixed address memory judges whether it is judged by Java object kind judgement section 204 that data corresponding to the unneeded Java object is present in fixed address memory area 105b and judges whether there is a request from download management section 106 for erasure of data corresponding to the unneeded Java object.

Erasing section 207 for fixed address memory erases data corresponding to the unneeded Java object stored in fixed address memory area 105b in accordance with the judgement results of erasure judgement section 206 for fixed address memory.

Figure 7:
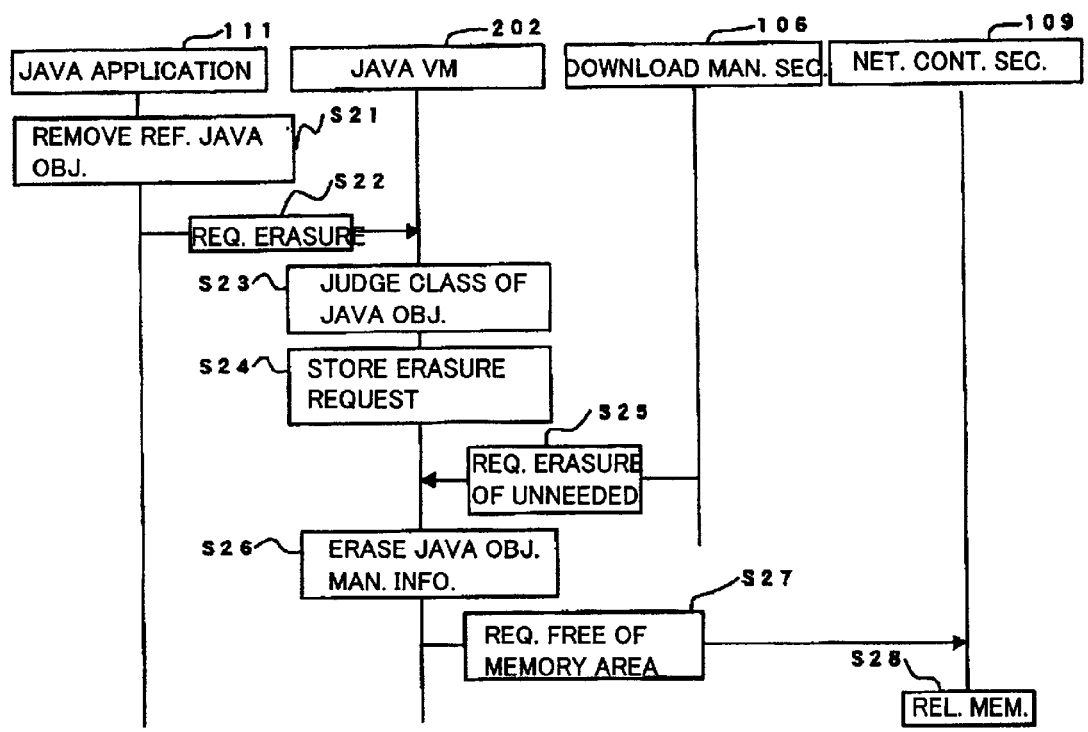
FIG. 7 is a flow chart showing the flow of processing to erase unneeded Java object in the object storage section according to Embodiment 2.

Now, there will be explained the processing flow of erasing unneeded Java objects in object storage section 105. FIG. 7 is a flow chart showing the flow of erasing unneeded Java objects in object storage section 105.

First, after execution of Java application 111 is over, reference to Java objects in object storage section 105 is removed (Step S 21). Then, a request to erase unneeded Java objects, reference to which is removed, is issued from Java application 111 to Java VM 202 (Step S 22).

Next, the Java object of which the erasure is requested is detected by unreference object detection section 203 of Java VM 202. It is judged by Java object kind judgement section 204 to which the detected Java object belongs, to variable address memory area 105a or to fixed address memory area 105b (Step S 23). If the detected Java object belongs to variable address memory area 105a, the Java object detected by erasing section 205 for variable address memory is erased.

If it is judged in Step S 23 that the Java object, the erasure of which is requested, is based on data stored in fixed address memory area 105b, a request for erasure of data corresponding to the Java object is stored by erasure judgement section 206 for fixed address memory (Step S 204).

After that, download management section 106 issues a request for erasure of data, for which the erasure request from Java object kind judgement section 204 is stored in Step S 24 (Step S 25). If an erasure request from download management section 106 is issued, erasure judgement section 206 for fixed address memory issues to erasing section 207 for fixed address memory a request for erasure of data, for which the erasure request is stored in Step S 24. If there is no request for erasure by download management section 106, erasure judgement section 206 for fixed address memory issues no erasure request to erasing section 207 for fixed address memory.

In other words, only when an erasure request from Java application 111 and an erasure request from download management section 106 are both issued, the unneeded data in fixed address memory area 105*b* is erased by erasing section 207 for fixed address memory. That is, only when no reference is made from any of the applications in memory management apparatus 200, unneeded data are erased, and therefore the dropping of data in executing applications can be avoided, and the communizing of memory can be safely materialized.

Either an erasure request from Java application 111 or an erasure request from download management section 106 may come first.

Next, erasing section 207 for fixed address memory erases a pointer in Java object table 103 corresponding to data, an object for erasure, and Java object management information stored in Java object management information section 104 (Step S 26).

Furthermore, erasing section 207 for fixed address memory makes a request to fixed address memory providing section 109 to free the memory area in fixed address memory area 105*b* where data, an object for erasure, is stored (Step S 27). After a request for erasure is received, fixed address memory providing section 109 erases data, an object for erasure, and free the memory (Step S 28).

As set forth above, only when no reference is made from any of the applications within memory management apparatus 200, unneeded data in fixed address memory area 105*b* is erased, and therefore the dropping of data in executing applications can be avoided, and the communizing of memory can be safely materialized.

Embodiment 3

In Embodiment 1, in order that Java application 111 reads out data generated in fixed address memory area 105*b* by the native program, its data management information is generated by GOBF section 102*d*.

But it is not necessary to generate management information by GOBF section 102*d* for all data generated in fixed address memory area 105*b* by the native program. It is not preferable that data in the fixed address memory area 105*b* is treated as Java object according to specification or function of OS to manage fixed address memory area 105*b* and apparatus.

For example, if data generated in 105*b* by the native program is small in size, and even if its data Java object is generated in variable address memory area 105*a*, frequency of relocation by GC function is low, processing overhead and reduction of memory efficiency hardly occur. Thereby, the demerit by its processing relatively small. However, if OS to manage the fixed address memory area 105*b* has no GC function, and small volume data in the fixed address memory area 105*b* is treated as Java object, the small volume data makes a fragmentation in the fixed address memory area 105*b*.

Meanwhile, in the case of large volume data such as sound, image data, if its data Java object is generated in variable address memory area 105*a*, as already mentioned, reduction of the overhead and memory efficiency will be large. Furthermore, if variable address memory area 105*a* is compressed by large volume data, relocation of Java objects by GC function occurs frequently, and the load of the system will be large. Even if the fixed address memory area 105*b* is small in size, when a term of validity of data is short, these demerits are large than demerits that the fixed address memory area is compressed. However, if the fixed address memory area 105*a* is small in size, and a validity of large volume data is long, it is preferable that Java object of data is generated in the variable address memory area 105*a*.

Figure 8:
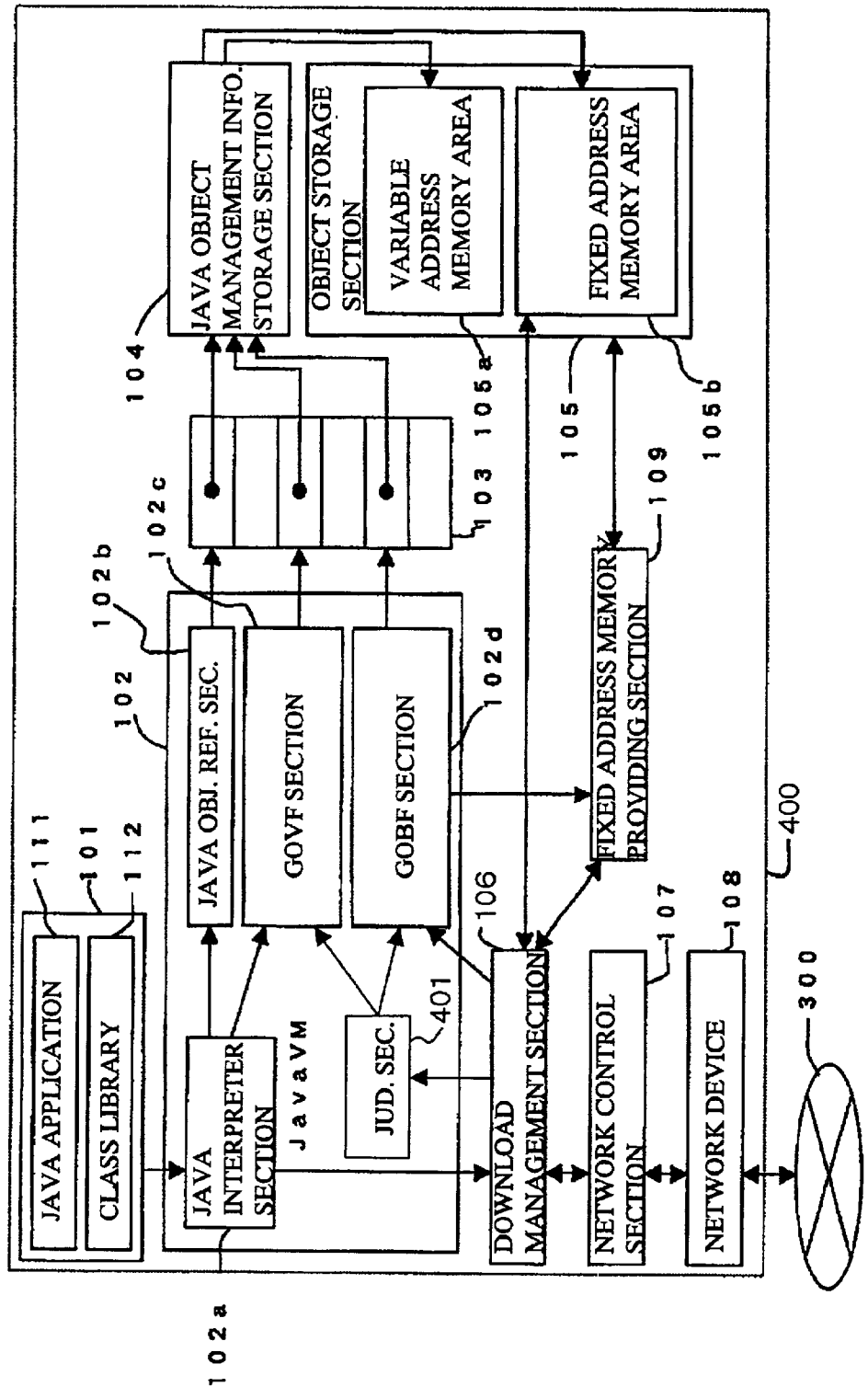
FIG. 8 is a functional block diagram showing a rough configuration of a memory management apparatus according to Embodiment 3.

As shown in FIG. 8, therefore, memory management apparatus 400 according to this Embodiment 3 has judging section 401 in addition to the configuration of memory management apparatus 100 according to Embodiment 1.

Judging section 401 judges in accordance with data stored in fixed address memory area 105*b* whether the Java object of the data is stored in variable address memory area 105*a*.

This judgement is made on the basis of data size, kind, term of validity etc. These bases are determined according to size of whole memory, its details (each size of the variable address memory area 105*a* and the fixed address memory area 105*b*), size or handling of data to be downloaded, function of OS to manage the fixed address memory area or the like.

For example, if the data size is large than a specific size or the validity term is longer than a specific period, and if the kind of data indicates AV data like sound, image data etc., it is judged that no Java object is stored in variable address memory area 105*a*. In this case, as described in Embodiment 1, data management information stored in fixed address memory area 105*b* is generated by GOBF section 102*d*. Java object reference section 102*b* reads out data, which is stored in fixed address memory area 105*b*, as Java object in accordance with this management information.

On the other hand, if the data size is smaller than the specific size or the data validity term is shorter than a specific period, and if the data kind indicates ordinary data other than AV data, it is judged that Java object is stored in variable address memory area 105*a*. In this case, the Java object stored in fixed address memory area 105*b* may be generated in variable address memory area 105*a* as usual.

In memory management apparatus 400 according to Embodiment 3, the processing flow from the downloading of download data D1 to reading out the data as Java object is basically identical with that explained in Embodiment 1 with reference to FIG. 4.

Figure 9:
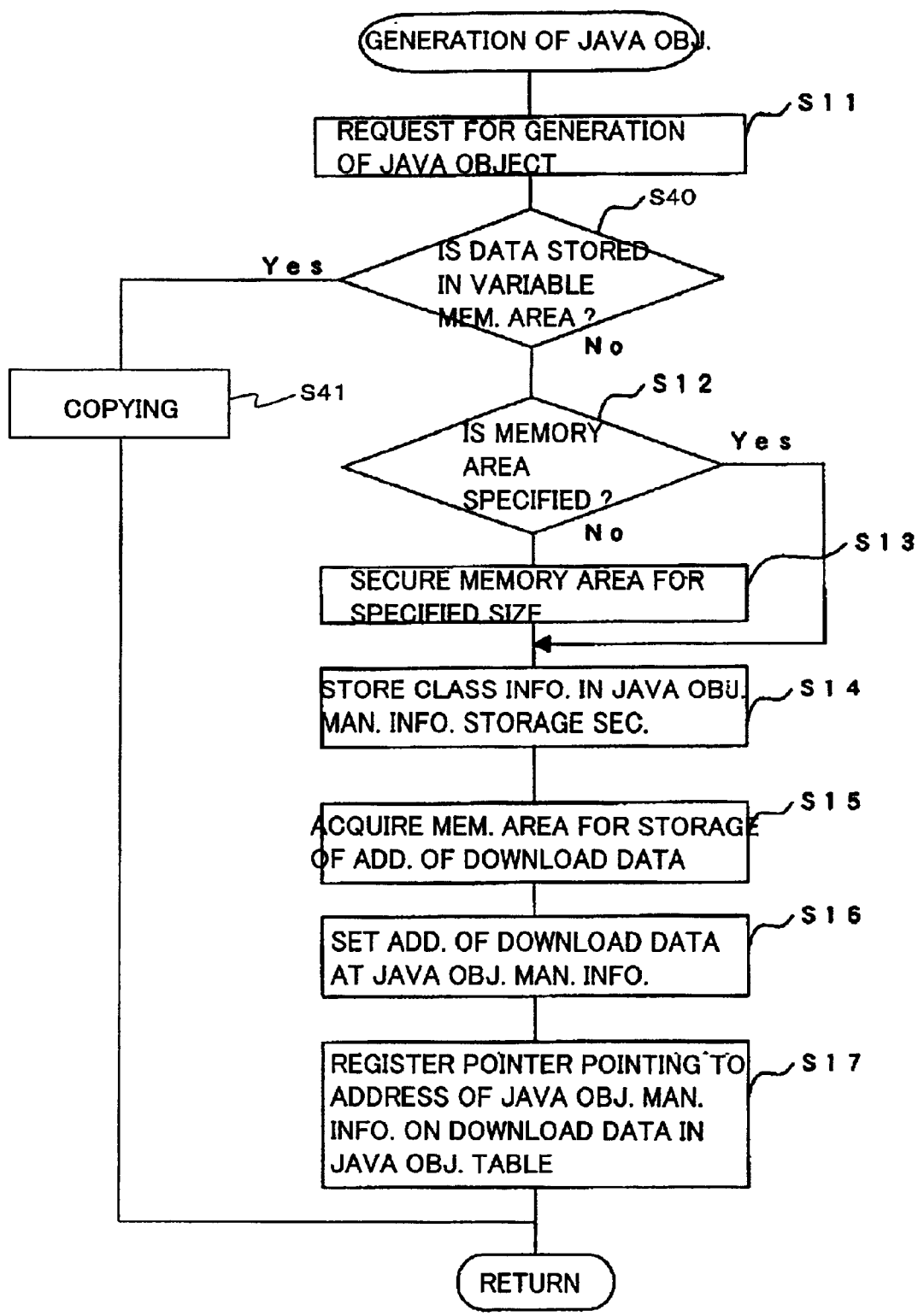
FIG. 9 is a flow chart showing the flow of Java object generation according to Embodiment 3.
Figure 10:
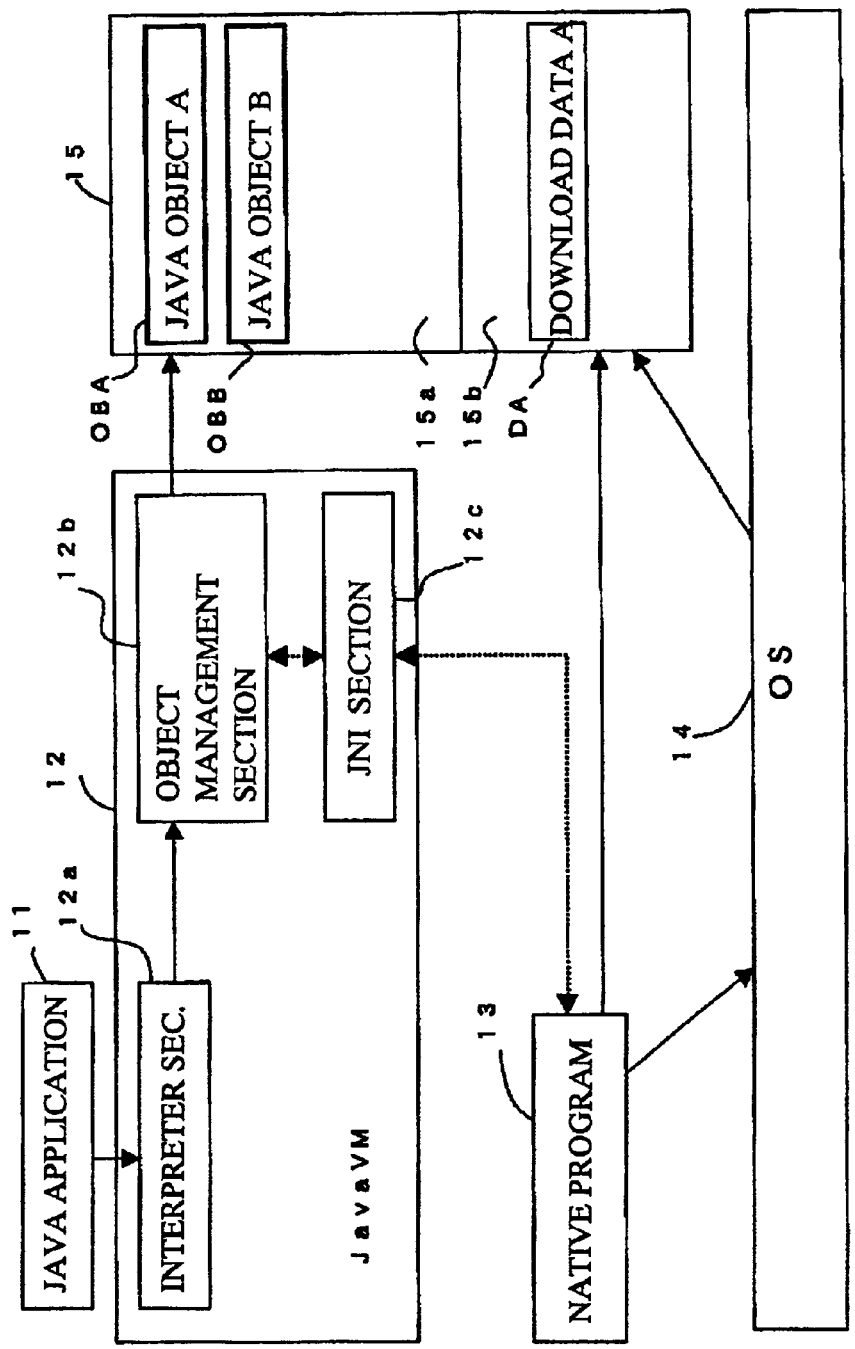
FIG. 10 is a functional block diagram of a conventional memory management apparatus to download image data in the related art technique.
Figure 11:
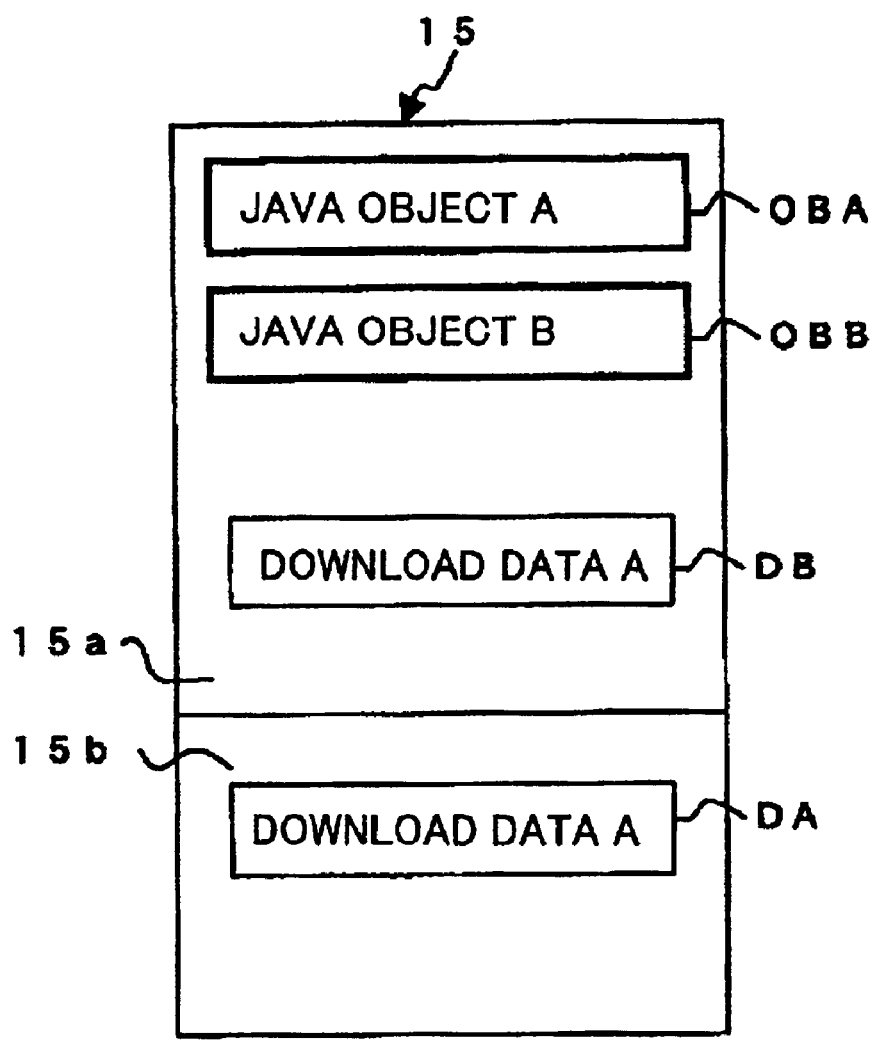
FIG. 11 is a diagram showing the state of the object storage section when downloaded data can be referred to as Java object.

But memory management apparatus 400 according to Embodiment 3 is different from that apparatus according to Embodiment 1 in part of Java object generation processing in Step S 5. FIG. 9 is a flow chart showing the flow of generation of Java object according to Embodiment 3.

As shown in FIG. 9, the flow of Java object generation according to Embodiment 3 is different from that of Embodiment 1 in that Steps S 40, S41 are added in Embodiment 3.

In Step S 11, when a request for generation of a Java object is made, the kind, size, validity term etc. of download data D1 stored in fixed address memory area 105*b* can be obtained.

In Step S 40, on the basis of the kind, size, validity term etc. of download data D1 stored in fixed address memory area 105*b*, judging section 401 judges whether the download data D1 is stored as Java object in variable address memory area 105*a*.

Only when it is judged that download data D1 is not stored in variable address memory area 105*a* as Java object, the process from Step S 12 onward is carried out as Embodiment 1.

On the other hand, if it is judged in Step S 40 that download data D1 is stored in variable address memory area 105*a* as Java object, the Java object of download data D1 is generated in variable address memory area 105*a* (Step S 41). The processing in Step S 41 is carried out as usual and details of this processing will not be explained.

In Embodiment 3 of the present embodiment as explained, only when it is judged according to the size of data etc. stored in the fixed address memory area that the data is stored in the variable address memory area, management information is generated. If the basis of the judgment is changed according to specification etc. of OS to manage the fixed address memory area or apparatus, the most suitable memory area to store the data is selected. Thereby, memory management will be effectively performed.

The present invention has been described in the respective embodiments in detail, but not limited to those embodiments and it is to be understood that changes and variations may be made without departing from the spirit or scope of the invention.

In the memory management apparatus according to the present invention, Java object is generated on the basis of data downloaded through the Internet 300. The present invention also can be applied to movable terminals such as cellar phone, set top box and digital TV. In digital TV, for example, the memory management apparatus according to the present invention can be applied to a digital TV receiving apparatus that can receive data convoluted on a carrier wave sent via the digital broadcasting network. When the present invention is applied to digital TV, a network device (see FIG. 1) is formed of a digital broadcasting receiving tuner to receive data.

The program of the present invention may be distributed or sold in the form that the program is downloaded to the client's computer memory or hard disk drive from the server connected via communication media such as the Internet. In this case, the program of the present invention is read by the client's computer, and the memory management apparatus or memory management method of the present invention is formed using that computer. Furthermore, the following mode may be adopted. In that mode, a program or data stored in memory etc. of other devices may be used via communication media.

Another mode may be possible in which the program of the present invention is stored in recording media such as CD-ROM, FD, DVD etc. and offered to general-purpose computers in removable form. That makes it possible to distribute and sell the program of the present invention easily as software product dependently of the apparatus. If this software is used with hardware such as a general-purpose computer, general-purpose game machine etc., the present invention can be easily carried out with those hardware.

According to the present invention, in accordance with a request from an object oriented program, management information is generated for an object oriented program to read data generated in the fixed address memory area by another program. And therefore that eliminates the need to copy downloaded data on a memory area managed by a program of the object oriented program as in the related art. Furthermore, processing overhead is removed, whereby processing load is reduced and the memory area can be used efficiently.

In addition, if the execution of Java application is completed and data in the fixed address memory area is no longer needed, unneeded data are erased from the fixed address memory area. And therefore the native program and vacant memory area as OS work area can be effectively secured.

Furthermore, only when it is judged in accordance with data stored in the fixed address memory area that the data is not stored in the variable address memory area, management information is generated, whereby memory management will be most suitable for data.

What is claimed is:

1. A memory management apparatus for managing a memory on which an object executed by an object oriented program is placed, wherein the object oriented program is executed by a virtual machine program, the object is stored in a variable address memory area of the memory, object management information by which the virtual machine program accesses the object is stored in the memory, and the variable address memory area is an area where the virtual machine program can change a stored position of the object by a garbage collect function of the virtual machine program, the memory having a fixed address memory area that a program other than the virtual machine program is allowed to access, where the virtual machine program cannot change a stored position of data by the garbage collect function, the memory management apparatus comprising:

a download management section for generating location information indicating a storage position of data downloaded to the fixed address memory area;

a judgment section for judging based on the data size or validity, or data type whether the downloaded data is stored in the fixed address memory area or in the variable address memory area; and a generating section for generating object management information by which the virtual machine program accesses the object data stored in the fixed address memory area, with reference to the location information, when it is judged that the downloaded data is stored in the fixed address memory area.

2. The memory management apparatus according to claim 1, wherein the location information includes a pointer pointing to the address of the object data, or class information of the object data.

3. The memory management apparatus according to claim 1, wherein, when it is judged that the downloaded object data is stored in the variable address memory area, the generating section copies the object data downloaded to the fixed address memory area to the variable address memory area, and generates the object management information by which the virtual machine program accesses the object copied to the variable address memory area.

4. The memory management apparatus according to claim 1, wherein the judgment section decides to store in the fixed address memory area an object data with large volumes of data represented by multimedia data.

5. The memory management apparatus according to claim 1, wherein the judgment section decides to store in the variable address memory area an object with small volumes of data.

6. The memory management apparatus according to claim 1, further comprising:

an object data detection section for detecting according to an erasure request from the virtual machine program the requested object data, an erasure judgment section for judging, when the object data detected by the object data detecting section is stored in the fixed address memory area, whether there is a request for erasing the object data from the program other than the virtual machine program, and an erasing section for erasing, when it is judged that there is a request for erasing the object data from the program other than the virtual machine program, the object data in the fixed address memory area and the object management information for the object generated by the generating section.

7. The memory management apparatus according to claim 1, wherein the object oriented program is prepared in JAVA language.

8. A memory management method for managing a memory on which an object executed by an object oriented program is placed, wherein the object oriented program is executed by a virtual machine program, object management information by which the virtual machine program accesses the object is stored in the memory, and the variable address memory area is an area where an address of the object is variable and controllable, the virtual machine program can change a stored position of the object by a garbage collect function of the virtual machine program, the memory having a fixed address memory area that a program other than the virtual machine program is allowed to access, where the virtual machine program cannot change a stored position of data by the garbage collect function, the memory management method comprising the steps of:

generating location information indicating a storage position of data downloaded to the fixed address memory area;

judging based on the data size or validity, or data type, whether the downloaded data is in the fixed address memory area or in the variable address memory area; and generating object management information by which the virtual machine program accesses the object data stored in the fixed address memory area, with reference to the location information, when it is judged that the downloaded data is stored in the fixed address memory area.

* * * * *